United States Patent [19]

Kuriyama

[11] Patent Number: 4,768,118
[45] Date of Patent: Aug. 30, 1988

[54] FLOATING-TYPE MAGNETIC HEAD

[75] Inventor: Toshihiro Kuriyama, Nagaoka, Japan

[73] Assignee: Alps Electric Co., Ltd., Japan

[21] Appl. No.: 90,611

[22] Filed: Aug. 28, 1987

[30] Foreign Application Priority Data

Oct. 28, 1986 [JP] Japan .................................. 61-258029

[51] Int. Cl.⁴ ...................... G11B 5/133; G11B 5/147; G11B 5/265
[52] U.S. Cl. .................................... 360/121; 360/120; 360/126; 360/127
[58] Field of Search ............... 360/121, 120, 103, 126, 360/127

[56] References Cited

U.S. PATENT DOCUMENTS

| | | | |
|---|---|---|---|
| 4,285,019 | 8/1981 | Scott et al. | 360/103 |
| 4,628,387 | 12/1986 | Furuichi | 360/121 |
| 4,669,015 | 5/1987 | Ruigrok | 360/121 |

Primary Examiner—Robert S. Tupper
Attorney, Agent, or Firm—Guy W. Shoup; Paul J. Winters

[57] ABSTRACT

A floating-type magnetic head comprises a leading magnetic core, a trailing magnetic core, and a thin layer of a magnetic metal formed between the cores. A first magnetic gap is formed between the leading core and the thin film. A second magnetic gap is formed between the thin layer and the trailing core. The depth Gd of the end surface of the leading core is set to a value less than 10 microns. The depth h of the end surface of the trailing core is set to a value exceeding 100 microns.

3 Claims, 2 Drawing Sheets 4,768,118

FLOATING-TYPE MAGNETIC HEAD

FIELD OF THE INVENTION

The present invention relates to a floating-type magnetic head and, more particularly, to a floating-type magnetic head having a magnetic gap structure of the metal-in-gap type.

BACKGROUND OF THE INVENTION

A known method of fabricating a floating-type magnetic head consists in forming a notch in the end surface of the leading magnetic core of a magnetic head to set the depth of this end surface as measured from the contact surface of the head making contact with a magnetic recording medium to a desired value (see Japanese Patent Laid-Open No. 94115/1977).

The present inventor has already proposed improved magnetic heads having a magnetic gap structure of the metal-in-gap type in Japanese Patent Application Nos. 156788/1986 and 197753/1986. In each of these improved heads, the width of the second magnetic gap is adjusted to reduce the peak shift caused by the interference between neighboring signal waveforms.

It is desired that the magnetic gap structure of the metal-in-gap type as proposed by the present inventor be used in a floating-type magnetic head, since the peak shift characteristics are improved. However, the conventional floating-type magnetic head has the problem that the second magnetic gap produces larger secondary gap pulses which are one kind of pseudosignals, and that the electromagnetic conversion efficiency is low.

SUMMARY OF THE INVENTION

In view of the foregoing, it is an object of the present invention to provide floating-type magnetic head which has a magnetic gap structure of the metal-in-gap type, suppresses the effects of the secondary gap pulses produced by the second magnetic gap, and yields an improved electromagnetic conversion efficiency.

The above object is achieved by a floating-type magnetic head comprising: a leading magnetic core; a trailing magnetic core disposed behind the leading core in the direction of movement of a magnetic recording medium with which the magnetic head makes a sliding contact; a first magnetic gap consisting of a thin nonmagnetic film of a given thickness, the film being located adjacent to the end surface of the leading core, the depth of the end surface of the leading core as measured from the surface of the head that makes contact with the magnetic recording medium being set to a value less than 10 microns; a thin layer of a magnetic material located adjacent to the first magnetic gap and having a given thickness; and a second magnetic gap formed between the thin layer of the magnetic material and the end surface of the trailing core, the depth of the end surface of the trailing core as measured from the surface of the head that makes contact with the magnetic recording medium being set to a value exceeding 100 microns.

DETAILED DESCRIPTION OF THE INVENTION

Figure 1:
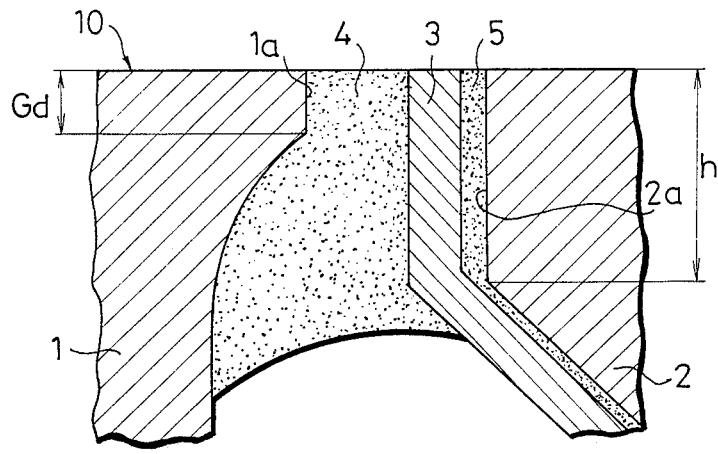
FIG. 1 is an enlarged cross section of the magnetic gap portion of a floating-type magnetic head according to the invention.
Figure 2:
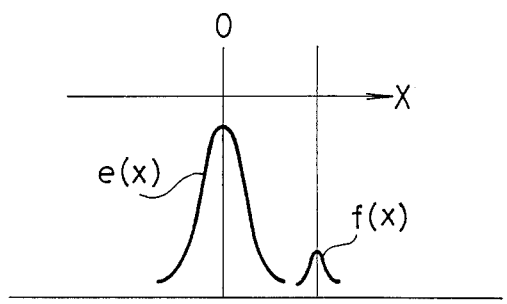
FIG. 2(a) is a graph for illustrating the operation of the magnetic head shown in FIG. 1.
FIG. 2(b) is a cross-sectional view of the magnetic head shown in FIG. 1, for helping understand the operation of the head.

Referring to FIG. 1, there is shown the magnetic gap portion of a floating-type magnetic head according to the invention. This head writes information in digital form onto, or retrieves information from a magnetic recording medium, for example a magnetic disk, at a high density. The head has a magnetic gap structure of the metal-in-gap type. The head comprises a leading magnetic core 1 and a trailing magnetic core 2, botn of which are made from MnZn or NiZn ferrite material that is a ferromagnetic oxide. The leading core 1 is located ahead of the trailing head 2 in the direction of movement of the magnetic recording medium. The cores 1 and 2 have opposed end surfaces 1a and 2a, respectively. A thin layer 3 made from a magnetic metal, such as Fe—Al—Si alloy, permalloy, or amorphous metal, is formed between the end surfaces 1a and 2a. A first magnetic gap 4 is formed between the end surface 1a and the thin layer 3. A second magnetic gap 5 is formed between the layer 3 and the end surface 2a. The first gap 4 has a large width, and is made of $SiO_2$, glass, or the like. The second gap 5 is very narrow, and is made of Cr, Ti, or other similar material. The thickness of the second gap 5 is quite small, say 200 to 500 Å.

The thin layer 3 is formed by depositing the aforementioned magnetic metal on the magnetic gap 5 by sputtering, evaporation, or other method after the second gap 5 is formed on the trailing core 2. The head has a surface 10 which makes a sliding contact with the magnetic recording medium. The second gap 5 is quite thin, and it is considered that a nonmagnetic region corresponding to the second gap is formed along the boundary between the end surface 2a of the core 2 and the thin layer 3, because of an effective magnetic gap arising from the difference in magnetic characteristics between the core 2 and the layer 3, diffusion of the magnetic materials, and chemical reactions. The thickness of the nonmagnetic region ranges from tens of angstroms to hundrends of angstroms. This nonmagnetic region acts as the second magnetic gap and so it is possible to omit the second magnetic gap 5.

The present inventor conducted experiments to determine the shape of the magnetic gap structure of the metal-in-gap type of the floating-type magnetic head which minimizes the effects of the secondary gap pulses. It has been found that when the second magnetic gap 5 and the thin layer 3 of the magnetic metal are formed on the end surface 1a of the leading core 1, the effects of the secondary gap pulses can be removed, but the electromagnetic conversion efficiency decreases. It has also been found that where the second gap 5 and the thin layer 3 are formed on the end surface 2a of the trailing core 2, when the depth Gd of the end surface 1a of the core 1 as measured from the contact surface 10 is small and the depth h of the end surface 2a of the core 2 as measured from the contact surface 10 is small, the electromagnetic conversion efficiency is high but the effects of the secondary gap pulses are large. Further, it has been found that where the second gap 5 and the thin layer 3 are formed on the end surface 2a of the core 2, when the depth Gd is small but the depth h is small the electromagnetic conversion efficiency is high, and the effects of the secondary gap pulses are small. Especially, when the depth Gd is set to a value less than 10 microns and the depth h is set to a value exceeding 100 microns, conspicuous results are obtained.

Figure 4A:
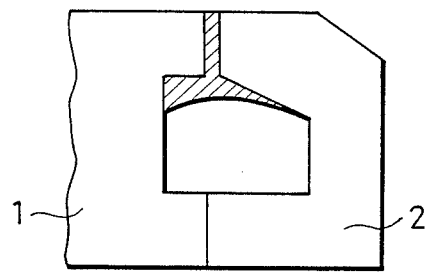
FIG. 4(a) is a side elevation of a conventional floating-type magnetic head.
Figure 4B:
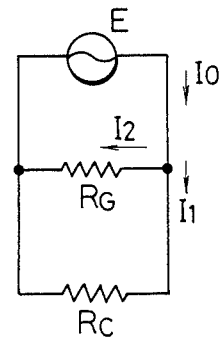
FIG. 4(b) is an equivalent magnetic circuit diagram of the head shown in FIG. 4(a), for illustrating the electromagnetic conversion efficiency.

Referring to FIG. 4(a), we now discuss a floating-type magnetic head not having the second magnetic gap. An equivalent magnetic circuit diagram of this head is shown in FIG. 4(b), where the magnetic reluctance of the magnetic gap and the magnetic reluctance of the whole magnetic core are indicated by $R_G$ and $R_C$, respectively. Since the relation $I_0 = I_1 + I_2$ holds for magnetic fluxes $I_0$, $I_1$, $I_2$, the ratio of the magnetic flux $I_1$ flowing through the magnetic core to the magnetic flux $I_0$ picked up at the magnetic gap, i.e., the electromagnetic conversion efficiency, is given by $$I_1/I_0 = R_G / (R_C + R_G) \qquad (1)$$

The magnetic flux source of the magnetic recording medium is indicated by E.

Figure 3A:
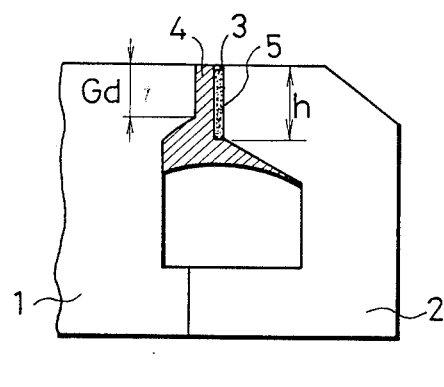
FIG. 3(a) is a side elevation of the magnetic head shown in FIG. 1.
Figure 3B:
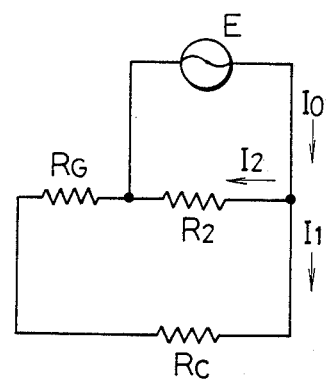
FIG. 3(b) is an equivalent magnetic circuit diagram of the head shown in FIG. 3(a), for illustrating the electromagnetic conversion efficiency of the head.

FIG. 3(a) is a side elevation of the floating-type magnetic head having the second magnetic gap 5 as shown in FIG. 1. An equivalent magnetic circuit diagram of this head is shown in FIG. 3(b), where the ratio of the magnetic flux $I_1$ flowing through magnetic cores 1 and 2 to the magnetic flux $I_0$ picked up at the second magnetic gap 5, i.e., the electromagnetic conversion efficiency, is given by $$I_1/I_0 = \frac{R_2}{(R_C + R_G) + R_2} \qquad (2)$$

Formula (1) represents the regeneration efficiency of the first magnetic gap 4. Formula (2) represents the regeneration efficiency of the second magnetic gap 5, for example the boundary surface between ferrite and a thin film of Sendust. Since the secondary gap pulses produced from the second gap 5 are usually deleterious and unwanted, it is desired to increase the value of formula (1) and to reduce the value of formula (2) for the floating-type magnetic head.

The value of formula (2) can be reduced by reducing the magnetic reluctance $R_2$ of the second magnetic gap 5 and increasing the magnetic reluctance $R_G$ of the first magnetic gap 4. Generally, the magnetic reluctance R of a magnetic gap having a width of $T_W$ is given by $$R = \frac{Gl}{\mu_0 \times Gd \times T_w} \qquad (3)$$

where Gl is the length of the gap, Gd is the depth of the gap, and $\mu_0$ is the magnetic permeability of the material from which the gap is made. This material is either glass or $SiO_2$. Accordingly, the magnetic reluctance $R_2$ of the second magnetic gap 5 can be reduced by increasing the depth h corresponding to the depth Gd included in formula (3). The magnetic reluctance $R_G$ can be increased by reducing the depth Gd. Increasing the value of the magnetic reluctance $R_G$ increases the value of formula (1) with desirable results.

As described above, in accordance with the present invention, the depth of the end surface of the leading magnetic core as measured from the surface making contact with the magnetic recording medium is set to a value less than 10 microns. The depth of the end surface of the trailing magnetic core as measured from the contact surface is set to a value exceeding 100 microns. Thus, the effects of the secondary gap pulses produced by the second magnetic gap can be suppressed. Also, the electromagnetic conversion efficiency is enhanced.

What is claimed is:

1. A floating-type magnetic head comprising:
   a leading magnetic core;
   a trailing magnetic core disposed behind the leading core in the direction of movement of a magnetic recording medium with which the magnetic head makes a sliding contact;
   a first magnetic gap consisting of a thin nonmagnetic film of a given thickness, the film being located adjacent to the end surface of the leading core, the depth of the end surface of the leading core as measured from the surface of the head that makes contact with the magnetic recording medium being set to a value less than 10 microns;
   a thin layer of a magnetic material located adjacent to the first magnetic gap and having a given thickness; and
   a second magnetic gap formed between the thin layer of the magnetic material and the end surface of the trailing core, the depth of the end surface of the trailing core as measured from the surface of the head that makes contact with the magnetic recording medium being set to a value exceeding 100 microns.

2. A floating-type magnetic head as set forth in claim 1, wherein the second magnetic gap is much thinner than the first magnetic gap.

3. A floating-type magnetic head as set forth in claim 1 or 2, wherein the thickness of the second magnetic gap ranges from 200 to 500 Å.

* * * * *